(12) United States Patent
Tyagi et al.

(10) Patent No.: US 9,813,801 B2
(45) Date of Patent: Nov. 7, 2017

(54) ILLUMINATED HEADPHONE SYSTEM

(71) Applicant: Corning Incorporated, Corning, NY (US)

(72) Inventors: Vineet Tyagi, Elmira Heights, NY (US); Michael Lucien Genier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/702,042

(22) Filed: May 1, 2015

(65) Prior Publication Data
US 2015/0334485 A1  Nov. 19, 2015

Related U.S. Application Data

(60) Provisional application No. 61/992,569, filed on May 13, 2014.

(51) Int. Cl.
*H04R 1/10* (2006.01)
*H01B 11/22* (2006.01)
(Continued)

(52) U.S. Cl.
CPC ....... *H04R 1/1091* (2013.01); *F21V 33/0056* (2013.01); *G02B 6/001* (2013.01); *G02B 6/02* (2013.01); *G02B 6/028* (2013.01); *G02B 6/02052* (2013.01); *G02B 6/02395* (2013.01); *H01B 11/22* (2013.01); *H04R 1/1033* (2013.01); *H04R 5/0335* (2013.01); *F21W 2131/30* (2013.01)

(58) Field of Classification Search
CPC .... H01B 11/22; H04R 1/1091; H04R 1/1033; H04R 5/0335; F21W 2131/30; F21V 33/0056; G02B 6/001; G02B 6/02; G02B 6/02052; G02B 6/02395; G02B 6/028
See application file for complete search history.

(56) References Cited

U.S. PATENT DOCUMENTS

| | | | | |
|---|---|---|---|---|
| 4,466,697 A | * | 8/1984 | Daniel | A47G 19/16 264/1.24 |
| 7,450,806 B2 | | 11/2008 | Bookbinder et al. | |

(Continued)

FOREIGN PATENT DOCUMENTS

CN  2688008 Y  3/2005

OTHER PUBLICATIONS

International Search Report and Written Opinion, PCT/US2016/029991, dated Jul. 12, 2016.

*Primary Examiner* — Andrew L Sniezek
(74) *Attorney, Agent, or Firm* — Svetlana Z. Short (57) ABSTRACT

A headphone system includes a first audio speaker assembly and a second audio speaker assembly, a connecting body extending between the first and second audio speaker assemblies, and a light-diffusing fiber coupled with the connecting body, the light-diffusing fiber having a glass core and a cladding. At least one of the glass core and a core-cladding interface includes a plurality of light scattering structures. A light source is optically coupled to the light-diffusing fiber and configured to emit light into the light-diffusing fiber. The light scattering structures are configured to scatter the emitted light and output the emitted light at least partially along a sidewall of the light-diffusing fiber.

20 Claims, 7 Drawing Sheets

(51) Int. Cl.
*G02B 6/02* (2006.01)
*F21V 8/00* (2006.01)
*F21V 33/00* (2006.01)
*G02B 6/028* (2006.01)
*H04R 5/033* (2006.01)
*F21W 131/30* (2006.01)

(56) References Cited

U.S. PATENT DOCUMENTS

| | | |
|---|---|---|
| 7,505,660 B2 | 3/2009 | Bickham et al. |
| 7,603,015 B2 | 10/2009 | Bickham et al. |
| 7,930,904 B2 | 4/2011 | Bookbinder et al. |
| 8,545,076 B2 | 10/2013 | Bickham |
| 8,591,087 B2 | 11/2013 | Bickham |
| 8,620,125 B2 | 12/2013 | Button |
| 8,724,942 B2 | 5/2014 | Logunov et al. |
| 8,787,717 B2 | 7/2014 | Logunov |
| 8,897,612 B2 | 11/2014 | Logunov |
| 2002/0064276 A1 | 5/2002 | Winegar |
| 2005/0175171 A1* | 8/2005 | Winegar ............. H04M 1/6033 379/430 |
| 2007/0081690 A1 | 4/2007 | Stagni et al. |
| 2007/0201227 A1 | 8/2007 | Camp et al. |
| 2011/0103607 A1* | 5/2011 | Bychkov ............. H04R 1/1033 381/74 |
| 2011/0305035 A1 | 12/2011 | Bickham et al. |
| 2012/0275178 A1 | 11/2012 | Logunov |
| 2012/0275180 A1* | 11/2012 | Button ................... G02B 6/001 362/558 |
| 2012/0275745 A1 | 11/2012 | Logunov |
| 2013/0088888 A1 | 4/2013 | Fewkes et al. |
| 2013/0114825 A1 | 5/2013 | Andreasen |
| 2013/0272014 A1 | 10/2013 | Logunov et al. |
| 2013/0294106 A1 | 11/2013 | Logunov |
| 2014/0092623 A1 | 4/2014 | Logunov et al. |
| 2015/0332810 A1 | 11/2015 | Crossland et al. |
| 2015/0334485 A1* | 11/2015 | Tyagi .................... H01B 11/22 381/74 |
| 2015/0373449 A1 | 12/2015 | Jackson |

* cited by examiner

FIG. 5A
FIG. 5B

ILLUMINATED HEADPHONE SYSTEM

CROSS-REFERENCE TO RELATED APPLICATION

The present application claims priority to and the benefit under 35 U.S.C. §120 of U.S. Patent Application No. 61/992,569 filed on May 13, 2014, entitled "LIGHT DIFFUSING FIBER FOR USE IN CONSUMER DEVICES," the entire disclosure of which is hereby incorporated herein by reference.

BACKGROUND

This disclosure pertains to a light and signal delivery system, and more particularly, to an illuminable transmission cable and its uses.

Aesthetic or fashionable elements are often a primary driving force in the sale of consumer electronic devices such as headphones. Headphones may be manufactured with a variety of different shapes, colors and sizes. Some headphones have luminescent elements that enable them to glow, but generally suffer from complex configurations and high energy dependency.

SUMMARY

According to one embodiment of the disclosure, a headphone system includes a first audio speaker assembly and a second audio speaker assembly, a connecting body extending between the first and second audio speaker assemblies, and a light-diffusing fiber coupled with the connecting body, the light-diffusing fiber having a glass core and a cladding. At least one of the glass core and a core-cladding interface includes a plurality of light scattering structures. A light source is optically coupled to the light-diffusing fiber and configured to emit light into the light-diffusing fiber. The light scattering structures are configured to scatter the emitted light and output the emitted light at least partially along a sidewall of the light-diffusing fiber.

According to another embodiment of the disclosure, a headphone system includes a first audio speaker assembly and a second audio speaker assembly and a light-diffusing fiber having a glass core and a cladding. At least one of the glass core and a core-cladding interface has a plurality of scattering structures. The light-diffusing fiber is configured to optically couple with a light source which emits light into the light-diffusing fiber. The scattering structures are configured to scatter the emitted light and output the emitted light along at least a portion of a sidewall of the light-diffusing fiber. An electrical conductor extends co-linearly with the light-diffusing fiber. A plug is optically coupled to the light-diffusing fiber and configured to be illuminated by the light-diffusing fiber.

According to another embodiment of the disclosure, a headset includes a light-diffusing fiber having a plurality of internal scattering structures. The fiber defines a first end and a second end and a sidewall extending between the first and second ends. A light source is optically coupled to the first end of the light-diffusing fiber and configured to emit light into the first end. At least some of the light is output from at least a portion of the sidewall of the light-diffusing fiber. An electrical conductor extends collinearly with the light-diffusing fiber and a cable jacket surrounds the light-diffusing fiber and the electrical conductor. A first audio speaker assembly and a second audio speaker assembly are electrically coupled to the electrical conductor. A support member is coupled to and extends between the first and second audio speaker assemblies. A housing is optically coupled with the second end of the light-diffusing fiber. The second end of the light-diffusing fiber is configured to illuminate the housing.

According to another embodiment of the disclosure, a headset includes a first audio speaker assembly and a second audio speaker assembly. A single light-diffusing fiber includes a plurality of internal scattering structures and a sidewall. A single light source is optically coupled with the light-diffusing fiber and configured to emit light into the light-diffusing fiber. At least some of the emitted light is output along at least a portion of the sidewall of the light-diffusing fiber. A transmission medium extends co-linearly with the light-diffusing fiber. The transmission medium is in communication with the first and second audio speaker assemblies.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

Figure 1:
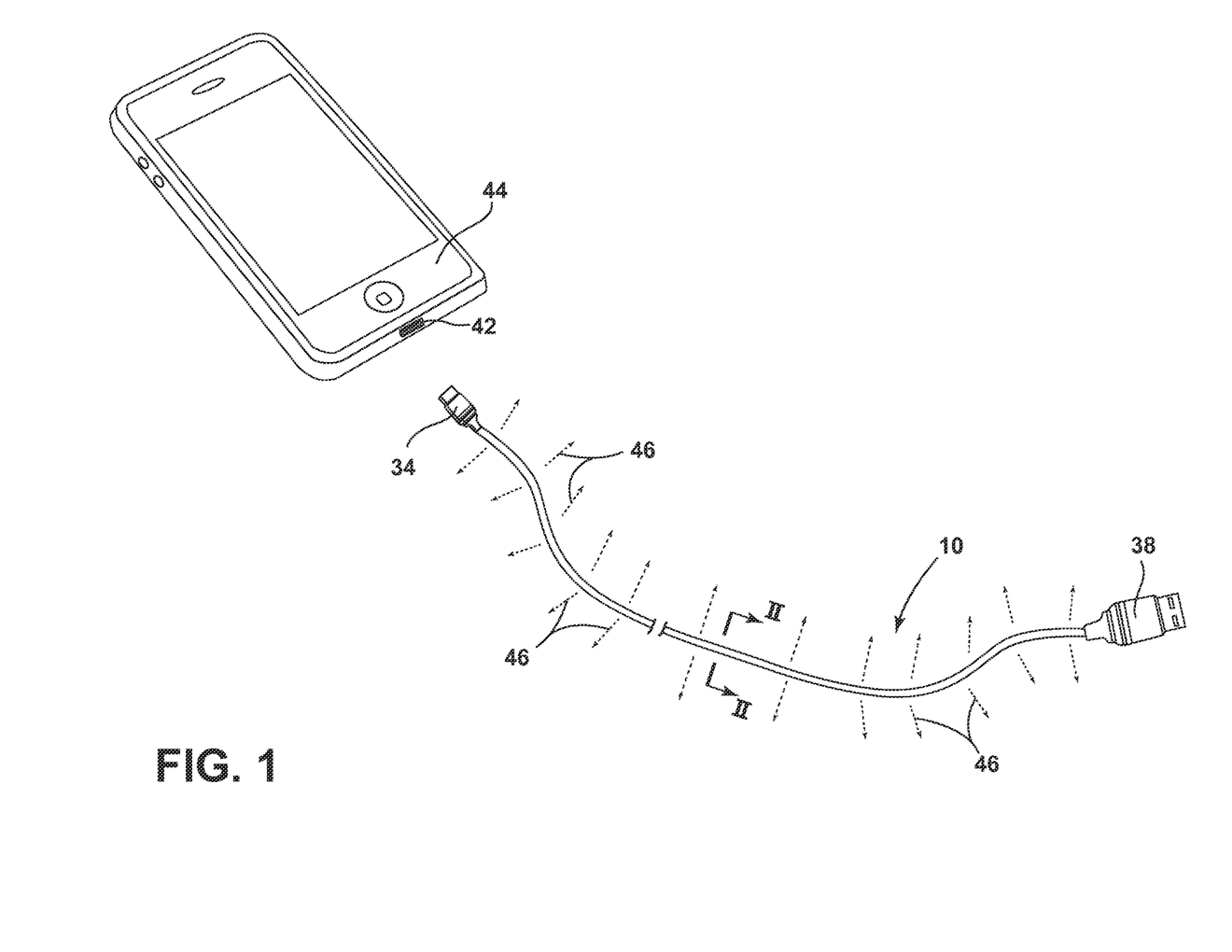
FIG. 1 is a perspective view of an illuminable transmission cable and an electronic device, according to one embodiment.

For purposes of description herein, the terms "upper," "lower," "right," "left," "rear," "front," "vertical," "horizontal," and derivates thereof shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Depicted in FIGS. 1-3B are various embodiments of a transmission cable 10 capable of being illuminated and for communicating with an electronic device 44. The illuminable transmission cable 10 may include a transmission medium 14 surrounded by a transmission jacket 18. The cable 10 also includes a light-diffusing fiber (LDF) 22 positioned within a fiber jacket 26. A cable jacket 30 may surround the transmission medium 14 and the light-diffusing fiber 22, as well as the associated transmission and fiber jackets 18, 26. The transmission cable 10 is depicted as having a first data plug 34 and a second data plug 38, but in some embodiments may only have a single data plug (e.g., the first or second data plugs 34, 38). The data plugs 34, 38 may be optically coupled to light-diffusing fiber 22 and the transmission cable 10. Although the transmission cable 10 is depicted as a universal serial bus (USB) cable in one embodiment, it should be understood that the present disclosure may be equally applicable to RCA cables for both composite video and stereo audio, high-definition multimedia interface cables, Ethernet cables, coaxial cables, headphone audio cables, as well as power cables (e.g., for a laptop computer, desktop computer, electronic device, cellphone charger, automotive and building power conduits, etc.). The transmission cable 10 may be configured (e.g., through alteration of the data plugs 34, 38 or otherwise) to couple with a variety of devices such as cell phones, headphones/headsets, computers, servers, other transmission cables of various types, building electrical cables, etc.

A light source 42 may be positioned within an electronic device 44 (e.g., MP3 player, headset, computer, cellphone, audio/video playback device, etc.) to which the transmission cable 10 may be inserted and/or otherwise engaged with and optically coupled to the light-diffusing fiber 22. In another embodiment, the transmission cable 10 may be part of an electronic device which includes the light source 42 (e.g., headset, cellphone charger, etc.). In other embodiments, the first and/or second data plugs 34, 38 may include the light source 42. The light-diffusing fiber 22 includes a first end and a second end, each of which may be configured to optically couple (e.g., accept light from) with a source of light (e.g., the light source 42) or configured (e.g., via cleaving at an angle, ball termination, etc.) to release the light 46. In operation, the light source 42 emits light 46 into the light-diffusing fiber 22 which is configured to scatter the light 46 and output at least a portion of the light 46 along at least a portion of a sidewall 50 of the light-diffusing fiber 22. The light 46 which is scattered out of the sidewall 50 of the light-diffusing fiber 22 may then be utilized to illuminate the transmission cable 10 and/or data plugs 34, 38.

In some embodiments, the transmission cable 10 is coextruded with all components (e.g., transmission medium 14, transmission jacket 18, light-diffusing fiber 22, fiber jacket 26, etc.) in a single step. Alternatively, the illuminated transmission cable 10 may be mechanically assembled and incorporated into the cable jacket 30 in separate steps.

The transmission medium 14 is configured to carry at least one of a signal or electrical power from one end of the illuminated transmission cable 10 to another. In one embodiment, the transmission medium 14 may incorporate one or more optical fibers for the transmission of optical signals. Both single mode and multimode optical fibers may be utilized as the transmission medium 14. Optical signals that the optical fibers transmit may include audio, video, data, or control signals. The transmission medium 14 may include a single optical fiber or a bundle of fibers. Additionally or alternatively, the transmission medium 14 may be configured as one or more electrical conductors (e.g., wires) such as copper, aluminum, silver, gold, other conductive materials and combinations thereof. Such electrical conductors would be useful for the transmission of electrical signals such as audio, video, data, and control signals. The transmission medium 14 may include a single conductor, or a bundle of conductors, and any associated insulating materials. In power embodiments, the transmission medium 14 may be configured to carry an electrical current along the transmission cable 10. Power embodiments of the transmission medium 14 may utilize the same materials as those used in the electrical signal embodiments.

The light-diffusing fiber 22 may be configured as a single light-diffusing fiber 22 or may be a bundled (or ribbonized) collection of light-diffusing fibers 22. Bundles and ribbons may incorporate two or more light-diffusing fibers 22 in a variety of configurations. Ribbonized configurations, one or more light-diffusing fibers 22 may be laminated onto a single polymeric sheet, or between polymeric sheets. The light-diffusing fiber 22 has a diameter of less than about 1,000 microns, less than about 750 microns, less than about 500 microns, and less than about 250 microns. In a specific embodiment, the diameter of the light-diffusing fiber 22 is about 250 microns. In embodiments where the light-diffusing fibers 22 are in a bundle, the bundle may have a diameter between about 250 microns and about four inches. Examples of techniques for designing and forming such light-diffusing fibers 22 may be found, for example, in U.S. Pat. Nos. 7,450,806; 7,930,904; and 7,505,660, and U.S. Patent Application Publication No. 2011/0305035, which are hereby incorporated by reference.

The light-diffusing fiber 22 includes a glass core 54 and a cladding layer 58. In some embodiments, the core 54 may be doped with fluorine. To induce scattering of the light 46 within the light-diffusing fiber 22, a plurality of scattering structures may be formed within the light-diffusing fiber 22. The scattering structures scatter the light 46 away from the core 54 through the cladding 58 and toward the sidewall 50 of the light-diffusing fiber 22. The scattered light 46 is then "diffused" through the sidewall 50 to provide illumination to the transmission cable 10. In one embodiment, the scattering structures of the light-diffusing fiber 22 are gas filled voids, or other nano-sized structures, configured to scatter the light 46. In embodiments where the scattering structures are gas filled voids, the gas may contain, for example, $SO_2$, Kr, Ar, $CO_2$, $N_2$, $O_2$ or mixtures thereof. The cross-sectional size (e.g., diameter) of the scattering structures (e.g., voids) as described herein may vary from about 10 nanometers to about 1 micron (for example, about 50 nanometers to about 500 nanometers), and a length may vary from about 1 millimeter to about 50 meters (e.g., about 2 millimeters to about 5 meters, or about 5 millimeters to about 1 meter). In other embodiments, the scattering structures may include high index materials configured to scatter the light 46. Exemplary high index materials include $GeO_2$, $TiO_2$, $ZrO_2$, $PbO_2$, and Zn. It should be understood that both gas filled voids and high index materials may be used concurrently as scattering structures, or that different portions of the light-diffusing fiber 22 may each have different types of scattering structures. Further, intentionally introduced surface defects on the core 54 or cladding 58 may also increase the amount of light 46 scattered by the light-diffusing fiber 22. Additionally or alternatively, the cladding layer 58 may be formed to include scattering structures (e.g., voids or high index materials) to scatter the light 46 and direct the light 46 through the sidewall 50 of the light-diffusing fiber 22.

The scattering structures may have a periodic or non-periodic order in the light-diffusing fiber 22. In other embodiments, some portions of the light-diffusing fiber 22 may have a periodic arrangement of scattering structures while other portions have a non-periodic arrangement. With increasing distance from the light source 42, the overall intensity of the light 46 scattered by the light-diffusing fiber 22 decreases due to a decrease in the light 46 available within the light-diffusing fiber 22. As such, the density or geometry of scattering structures may change with increasing distance from the light source 42 in order to provide substantially constant illumination across the light-diffusing fiber 22.

In one embodiment, the light-diffusing fiber 22 has the ability to scatter a specific spectral range (e.g., visible spectral range) of the light 46, while not substantially scattering a different spectral range (e.g., signal carrying range or near infrared) of the light 46. The spectral range at which the scattering structures scatter may be controlled via geometry of the scattering structures (e.g., size, shape, length) and/or by the type of scattering structure (e.g., gas filled void, high index material, or surface defect). The amount of the light loss in a specific spectral range via scattering can be increased by changing the properties of the glass in the light-diffusing fiber 22, the percentage of the light-diffusing fiber 22 having the scattering structures, and the size and/or the density of the scattering structures.

Scattering loss of the light-diffusing fiber 22 may be controlled throughout steps of fiber manufacture and processing. During the scattering structure formation process, the formation of a greater number of scattering structures (e.g., voids, high index materials) will generally increase the amount of light 46 scattered, and during the drawing of the fiber 22, the scattering can be controlled by using high or low tension to create higher or lower loss, respectively. To maximize scattering of the light 46, the cladding layer 58 may be removed, over at least a portion of the light-diffusing fiber 22 length, if not all.

The light 46 may be scattered in a substantially uniform manner over the length of the light-diffusing fiber 22. The light-diffusing fiber 22 may have a scattering loss in excess of 50 dB/km (for example, greater than 100 dB/km, greater than 200 dB/km, greater than 500 dB/km, greater than 1000 dB/km, greater than 3000 dB/km, greater than 5000 dB/km). The intensity variation of the scattered light 46 coming through sidewall 50 of the light-diffusing fiber 22 is less than about 60%, less than about 50%, less than about 40%, less than about 30%, less than about 20%, and less than about 10% for the target length of the light-diffusing fiber 22. In order to reduce or to eliminate bright spots at points where the light-diffusing fiber 22 bends, it is desirable that the increase in attenuation at a 90° bend in the fiber is less than 5 dB/turn (for example, less than 3 dB/turn, less than 2 dB/turn, less than 1 dB/turn) when the bend diameter is less than 50 millimeters. In an exemplary embodiment, these low bend losses are achieved at even smaller bend diameters, for example, less than 20 mm, less than 10 mm, and even less than 5 mm.

In various embodiments throughout the disclosure, the fiber jacket 26, the cable jacket 30, and the transmission jacket 18 may be transmissive to the scattered light 46 and/or include at least one photoluminescent (e.g., fluorescent and/or phospholuminescent) material configured to emit light/glow when excited by the light 46 scattered from the light-diffusing fiber 22. Embodiments where the fiber jacket 26 and the cable jacket 30 are transmissive provide the advantage of allowing the greatest amount of scattered light 46 to exit the transmission cable 10, thus increasing the perceived illumination of the cable 10. In a specific embodiment, the cable jacket 30 may be transflective giving the cable 10 a reflective appearance when the light source 42 is on, but allowing the scattered light 46 to pass through and illuminate the cable 10 when the light-diffusing fiber 22 is scattering light. Embodiments utilizing photoluminescent (e.g., fluorescent and/or phospholuminescent) materials benefit from their addition in that the illuminated transmission cable 10 may be more evenly illuminated due to the diffusing nature of the photoluminescent (e.g., fluorescent and/or phospholuminescent) materials in the jackets 26, 30. Additionally, the glow of the photoluminescent (e.g., fluorescent and/or phospholuminescent) material in the cable jacket 30 may help to conceal one or more non-illuminated structures (e.g., transmission medium 14, transmission jacket 18, filler material) within the transmission cable 10. Additionally or alternatively, the light-diffusing fiber 22 and/or cable jacket 30 may be coated with inks that contain scattering pigments or molecules, such as $TiO_2$.

Figure 2A:
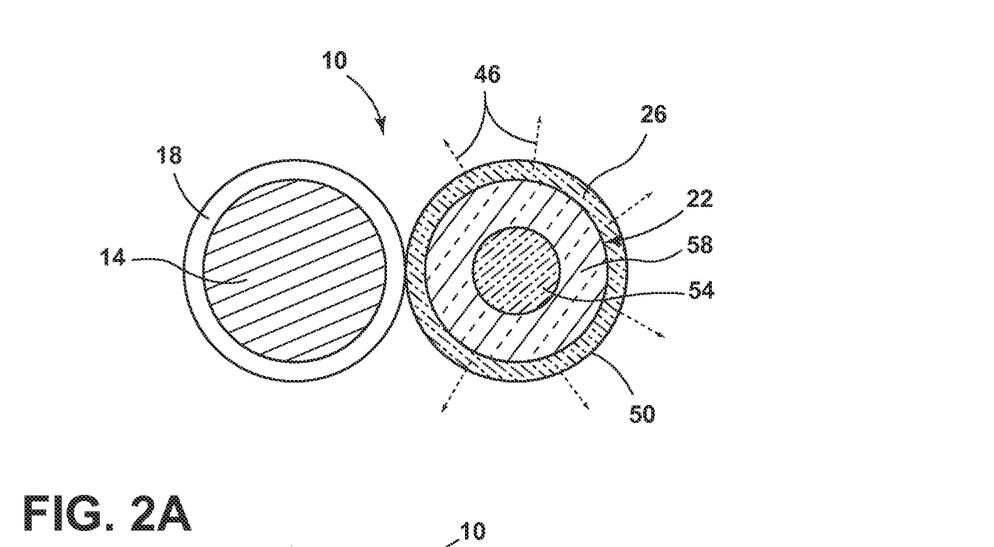
FIG. 2A is a diagrammatic cross sectional view taken along line II-II of the cable of FIG. 1, according to one embodiment.

Referring now to the depicted embodiment of FIG. 2A, the transmission cable 10 may simply include the transmission medium 14, the transmission jacket 18, the light-diffusing fiber 22 and the fiber jacket 26. The transmission medium 14 and the light-diffusing fiber 22 extend co-linearly with one another along a substantial length of the transmission cable 10. The transmission jacket 18 may be coupled to the fiber jacket 26 adhesively and/or mechanically to keep the transmission cable 10 from separating during use. In one mechanical coupling embodiment, the transmission medium 14 and the light-diffusing fiber 22 may be co-extruded in a single polymeric jacket (i.e., replacing the transmission jacket 18 and the fiber jacket 26) in a spaced apart (e.g., ribbonized) or touching configuration.

In such an embodiment, the fiber jacket 26 may either be transmissive to the scattered light 46 or incorporate the photoluminescent (e.g., fluorescent and/or phospholuminescent) materials as explained above.

Figure 2B:
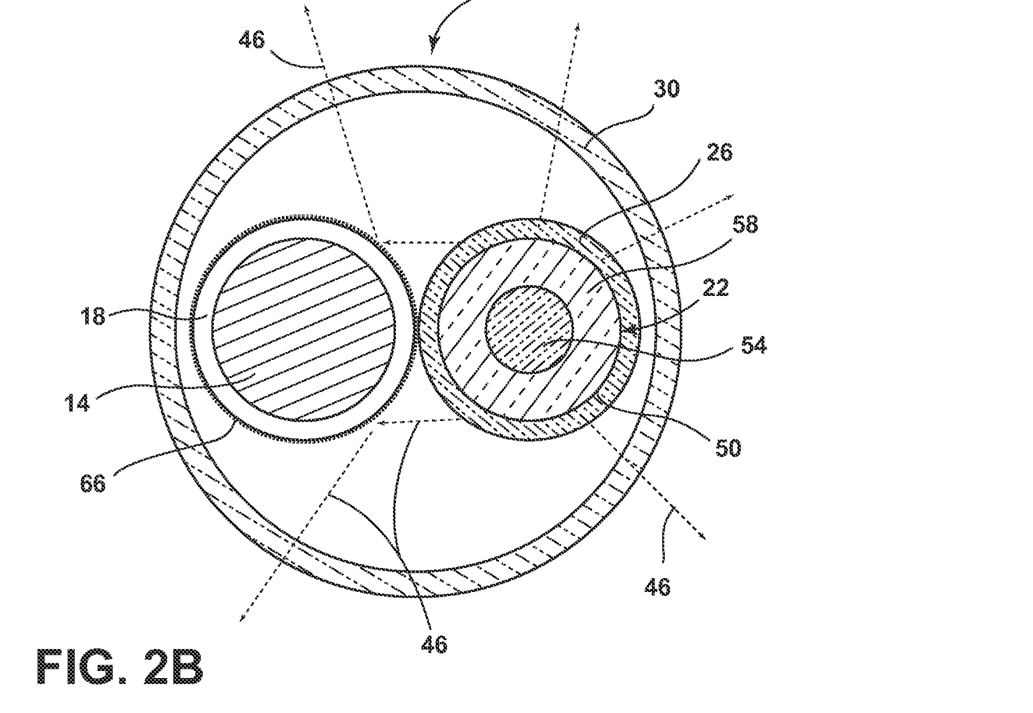
FIG. 2B is a diagrammatic cross sectional view taken along line II-II of the cable of FIG. 1, according to another embodiment.

Referring now to the configuration show in the embodiment of FIG. 2B, the transmission cable 10 includes the cable jacket 30 surrounding the fiber jacket 26 and the transmission jacket 18. In embodiments where the transmission jacket 18 does not incorporate photoluminescent (e.g., fluorescent and/or phospholuminescent) material, an optical reflector 66 may be positioned around the transmission jacket 18 to aid in reflecting the light 46 scattered by the light-diffusing fiber 22 toward the cable jacket 30. The reflector 66 may include a wrapped metal foil (e.g., aluminum foil), metalized mylar, braided copper shielding, or other sufficiently reflective materials to reflect the light 46. In embodiments where the transmission medium 14 includes at least one metallic electrical conductor and the transmission jacket 18 is transparent, the electrical conductor may be configured to have sufficient luster to reflect the scattered light 46 out of the illuminated transmission cable 10.

Figure 2C:
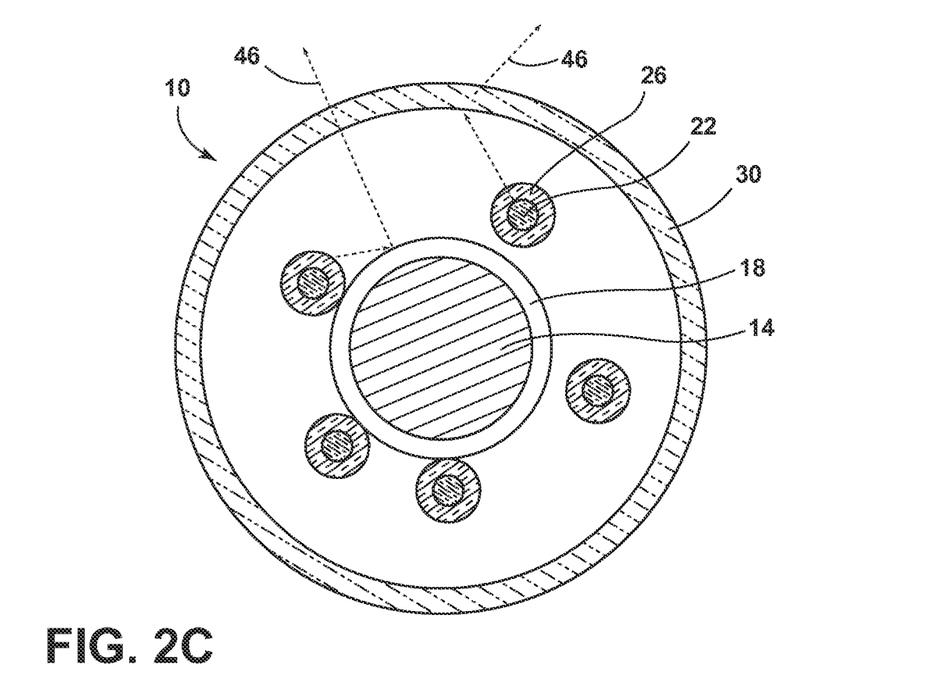
FIG. 2C is a diagrammatic cross sectional view taken along line II-II of the cable of FIG. 1, according to another embodiment.

Referring now to FIG. 2C, a plurality of light-diffusing fibers 22 may partially or substantially encircle the transmission medium 14 and transmission jacket 18. In one embodiment, the light-diffusing fibers 22 may be in a ribbonized configuration with the ribbon being folded around the transmission jacket 18. In another embodiment, the light-diffusing fibers 22 may branch off of the transmission cable 10 at different lengths of the cable 10 or at a common point along the cable 10. Providing more light-diffusing fibers 22, each optically coupled to the light source 42 or to separate light sources, allows for a greater illumination of the transmission cable 10. Additionally, by positioning multiple light-diffusing fibers 22 around the transmission medium 14, a more evenly distributed illumination of the transmission cable 10 may be achieved. Optionally, each of the light-diffusing fibers 22 may carry light having a different color, allowing static or dynamic color mixing of light within the illuminated transmission cable 10.

Figure 2D:
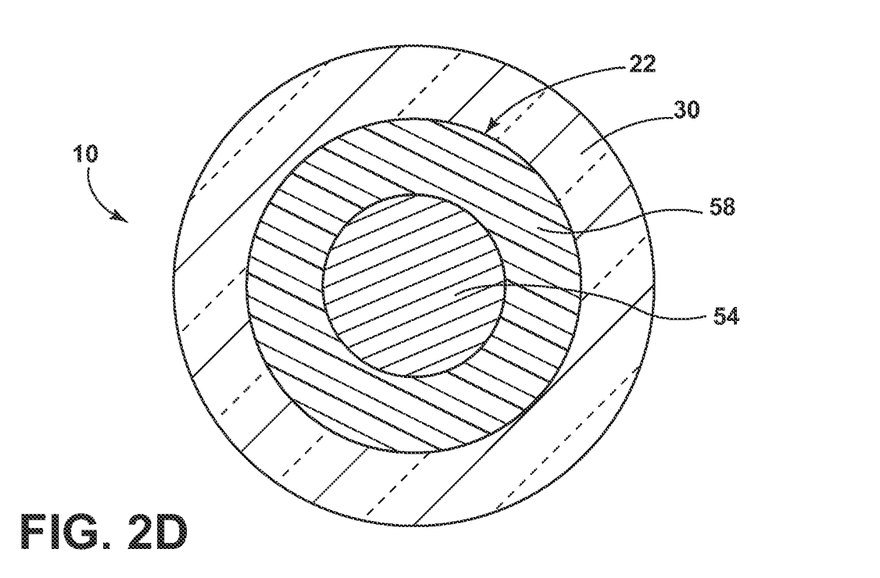
FIG. 2D is a diagrammatic cross sectional view taken along line II-II of the cable of FIG. 1, according to another embodiment.

Referring now to the depicted embodiment of FIG. 2D, the transmission cable 10 may include a single light-diffusing fiber 22. In such an embodiment, the light-diffusing fiber 22 may function to scatter the light 46 (not shown) from the sidewall 50, while also transmitting an optical signal along the transmission cable 10. As explained above, the scattering structures of the light-diffusing fiber 22 may be of a sufficient size to scatter light within a visible spectral range (e.g., visible light), but not large enough to scatter light in a signal spectral range (e.g., near infrared or ultraviolet wavelengths). Such a configuration of the scattering structures would allow a visible portion of the light 46 to be scattered and illuminate the transmission cable 10, while also allowing an optical signal portion of the light 46 to be transmitted across the cable 10 and be substantially un-scattered. In another embodiment, the optical signal may be carried on the light 46 itself. For example, the light source 42 may modulate the light 46 faster than perceptible by a human eye such that the modulation is not noticed by an observer, but still carries a signal (e.g., audio, video, data, and/or control signal). It should be understood that a plurality of light-diffusing fibers 22 may be included in the transmission cable 10, each of which is capable of scattering the light 46 and transmitting an optical signal.

Figure 3A:
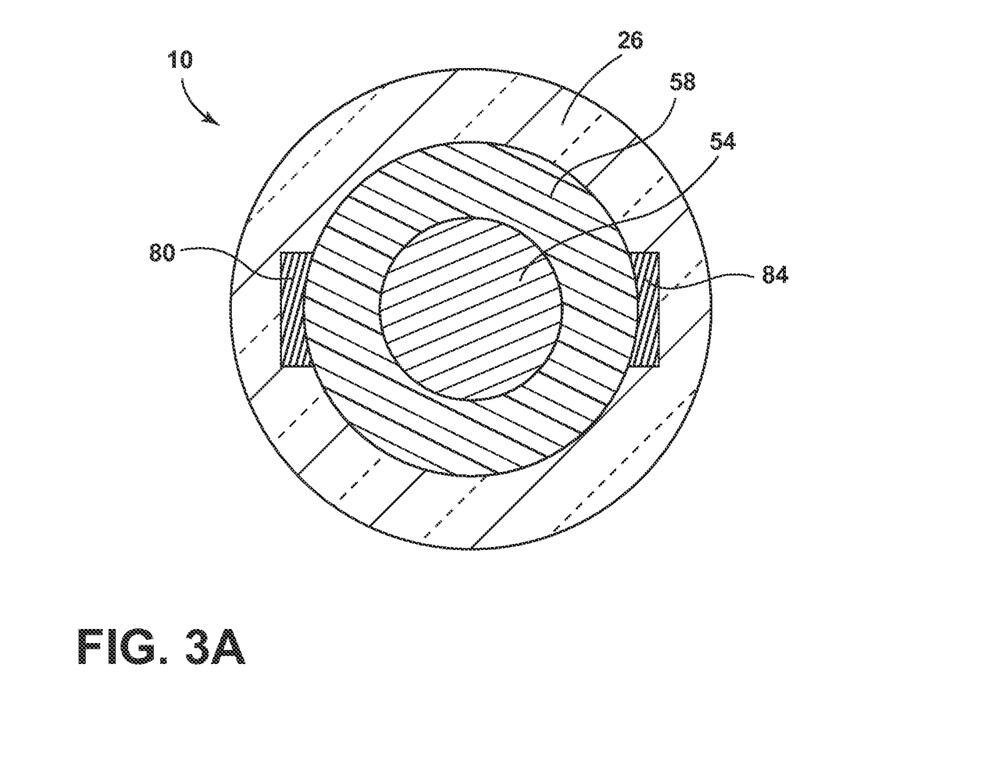
FIG. 3A is a diagrammatic cross sectional view taken along line II-II of the cable of FIG. 1, according to another embodiment.
Figure 3B:
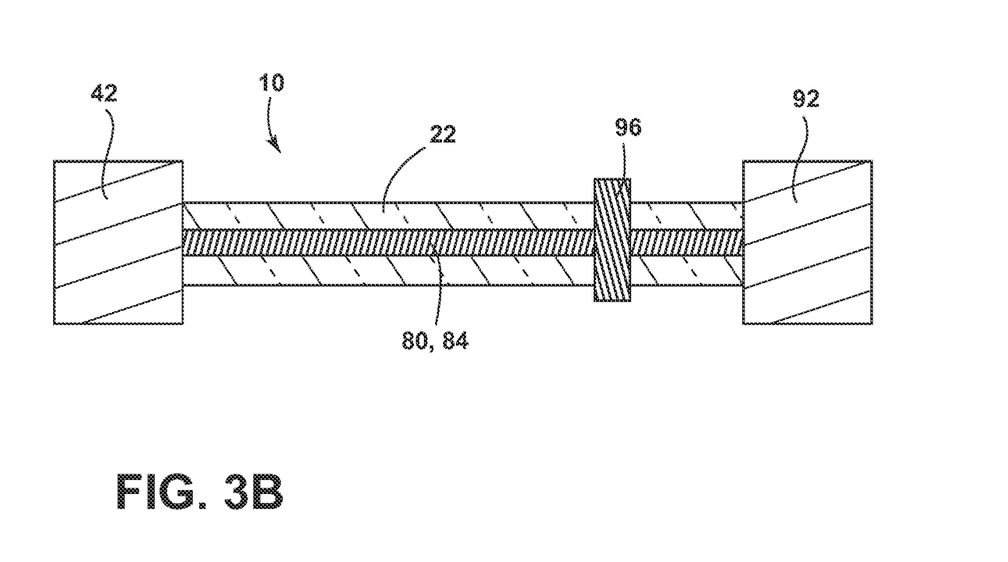
FIG. 3B is a diagrammatic side view of the cable of FIG. 1, according to another embodiment.

Referring now to FIGS. 3A-B, the illuminated transmission cable 10 may optionally include a first conductive strip 80 and a second conductive strip 84 positioned on the sidewall 50 of the light-diffusing fiber 22. The first and second conductive strips 80, 84 may be covered by the fiber jacket 26. The first and second conductive strips 80, 84 may include a conductive metal applied via physical vapor deposition, a conductive metallic ink, a clear conductive material (e.g., indium tin oxide, fluorine tin oxide), printed on or combinations thereof. The first and second conductive strips 80, 84 may be between about 20 microns and about 100 microns wide. The first and second conductive strips 80, 84 may have a thickness greater than about 10 nanometers, greater than about 100 nanometers, greater than about 1 micron, greater than about 10 microns, or greater than 100 microns. The first and second conductive portions 80, 84 may extend the length of the transmission cable 10. The first and second conductive strips 80, 84 are depicted angularly spaced apart about 180 degrees, but may be positioned on the light-diffusing fiber 22 between about 2 degrees and about 180 degrees apart. The first and second conductive strips 80, 84 may vary in position with respect to one another across the length of the light-diffusing fiber 22. At predetermined positions along the light-diffusing fiber 22, the conductive strips 80, 84 may move closer (e.g., between about 2 degrees and about 90 degrees apart) to one another to, for example, facilitate electrical communication. In some embodiments where a ground is separately provided or otherwise not necessary, the transmission cable 10 may include only one conductive strip (e.g., the first or second conductive strips 80, 84). It should be understood that although not depicted with the transmission medium 14 or the transmission jacket 18, embodiments utilizing the first and second conductive strips 80, 84 may also include the transmission medium 14 and/or the transmission jacket 18.

In operation, the first and second conductive strips 80, 84 are configured to transfer an electrical current or electrical signal along the transmission cable 10. Such an embodiment is advantageous in that it may allow for the elimination of a transmission medium 14 and transmission jacket 18, thus decreasing the size and weight of the transmission cable 10. Additionally, providing an electrical power source with the light-diffusing fiber 22 may extend the length at which the fiber 22 may be utilized. For example, in long runs of the light-diffusing fiber 22, the intensity of the scattered light 46 may fall to below aesthetically desirable levels with increasing distance from the light source 42. In such a circumstance, the first and second conductive strips 80, 84 may transmit electrical power to a second light source 92 optically coupled to the light-diffusing fiber 22. Use of the second light source 92 allows for more light 46 to be added to the light-diffusing fiber 22 such that degradation in the illumination of the transmission cable 10 is not readily apparent to an observer. It should be understood that the first and second conductive strips 80, 84 may be utilized without the first light source 42 and that the strips 80, 84 may provide power to the only light source (e.g., the second light source 92) optically coupled with the fiber 22.

Utilization of the first and second conductive strips 80, 84 allows incorporation of a variety of sensors into the transmission cable 10 which may employ the strips 80, 84. Exemplary sensors include those operating on resistance and/or capacitance between the first and second conductive strips 80, 84. In the depicted embodiment, a connection point 96 is positioned on the transmission cable 10 and is configured to be in electrical contact with both the first and second conductive strips 80, 84. Movement of the connection point 96 along the transmission cable 10 increases and decreases a resistance through the first and second conductive strips 80, 84. By measuring the change in the resistance of the cable as the connection point 96 is moved along conductive strips 80, 84, a signal can be generated. This signal may be used (e.g., by a controller in the electronic device 44) to control such features as volume, intensity of the scattered light 46, device mode, track playback, or whether or not to enable communication across the transmission cable 10. It should be understood that that connection point 96 may be replaced with such features as a capacitive pad or other sensors capable of employing the first and second conductive strips 80, 84. In yet other embodiments, a user's finger, run across the transmission cable 10, may be enough to register a change in the resistance or capacitance between the first and second conductive strips 80, 84 and thus control the feature.

Referring now to FIGS. 4A-D, depicted are various embodiments of audio headsets 100 (e.g., headphones, earbuds, etc.) for the use of conveying audio information (e.g., music, books, self-guided tours, etc.) to a user which employ various embodiments of the transmission cable 10. The headsets 100 generally include a first audio speaker assembly 104 and a second audio speaker assembly 108. In some embodiments, the headset 100 may include the transmission cable 10 extending from the electronic device 44 (FIG. 1) to the first and second audio speaker assemblies 104, 108. In such an embodiment, the transmission medium 14 may serve to communicate electrical audio signals to the headset 100 (e.g., the first and second speaker assemblies 104, 108) while the light-diffusing fiber 22 provides illumination to the transmission cable 10. Alternatively, as described above, the light-diffusing fiber 22 may both illuminate the transmission cable 10 and transmit optical signals to and from the headset 100 (e.g., first and second speaker assemblies 104, 108). In other embodiments, the headset 100 may be a wireless configuration incorporating the illuminated transmission cable 10 extending within the headset 100 itself (e.g., from a controller within the headset 100 to, or between, the first and second audio speaker assemblies 104, 108).

Use of the transmission cable 10 with the headset 100 or electronic device 44 may allow dynamic control of the illumination provided by the cable 10. For example, a controller positioned in the electronic device 44 or headset 100 may communicate with the light source 42, and/or the second light source 92, to alter the color, frequency and intensity of the light 46. For example, based on a type of music being played, the controller may change the illumination color of the cable 10, pulse the illumination synchronously with a beat of the music, or provide a visualization effect to the music. In other embodiments, the user may activate a safety or emergency setting of the electronic device 44 or headset 100 causing the cable 10 to flash with a frequency and color configured to attract the attention of observers.

Figure 4A:
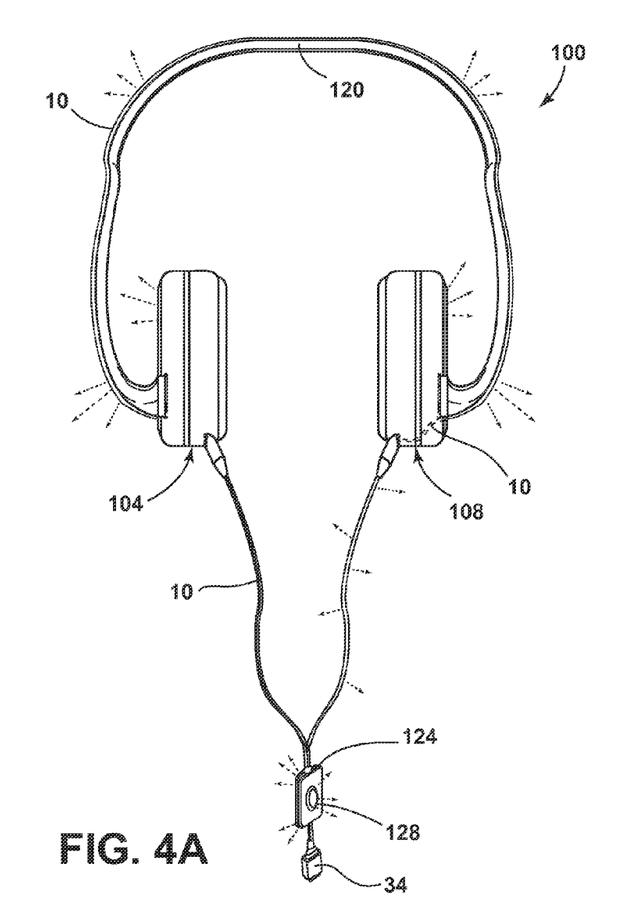
FIG. 4A is a top plan view of a headset according to one embodiment.
Figure 4B:
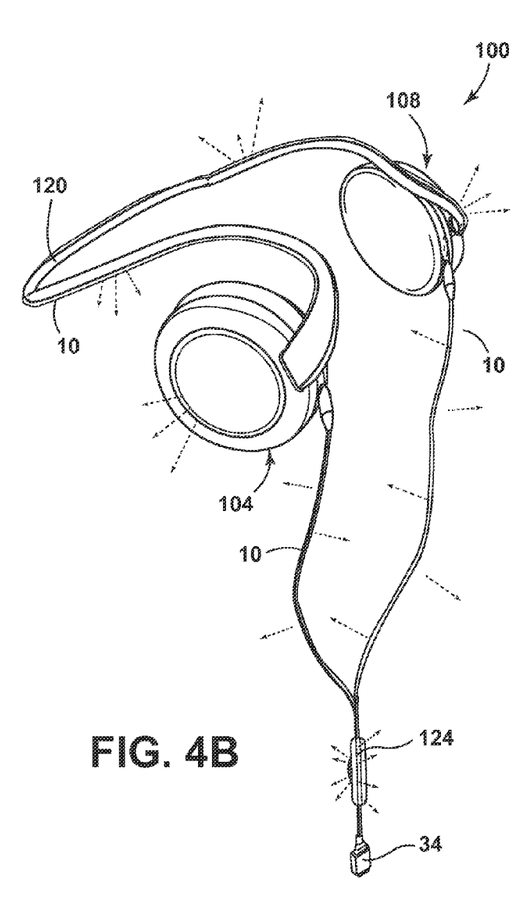
FIG. 4B is a perspective view of the headset of FIG. 4A.

FIGS. 4A and 4B depict an embodiment of the headset 100 having a single transmission cable 10 extending from the electronic device 44 to both the first and the second audio speaker assemblies 104, 108. The first and second audio speaker assemblies 104, 108 are both coupled to a support member 120. The support member 120 is configured to wrap behind the head of a user of the headset 100 and position the first and second audio assemblies 104, 108 proximate the user's ears. The transmission cable 10 is coupled to the support member 120 and is configured to wrap behind the head of the headset 100 user with the support member 120. The transmission cable 10 may be coupled to an exterior of the support member 120 such that the scattered light 46 is visible to onlookers to provide an aesthetic and/or safety function. Alternatively, the transmission cable 10 may be positioned within a light transmissive embodiment of the support member 120 such that the scattered light 46 may exit the support member 120. By coupling the transmission cable 10 to the support member 120, the cable 10 avoids tight bends in the light-diffusing fiber 22 or the transmission medium 14 which could result in loss of light 46 or signal (e.g., optical and/or electrical). Additionally, the support member 120 may include a rigid material or structure configured to resist bending of the support member 120 and the transmission cable 10. The transmission cable 10 extends past the second audio speaker assembly 108 and terminates within a housing 124. The housing 124 may include a control 128 (e.g., a button, slide, etc.) capable of controlling a feature about the electronic device 44 or headset 100 (e.g., volume, track, light intensity, device mode, etc.). A signal from the control 128 may be carried on the transmission medium 14, the first and second conductive strips 80, 84, and or the light-diffusing fiber 22, to a controller in the electronic device 44 or the headset 100.

Not all light 46 which enters the light-diffusing fiber 22 may be scattered. In some embodiments, only a portion of the light 46 from the light source 42 reaches the light-diffusing fiber 22 and illuminates the housing 64. It should be understood that the light source 42 may be positioned within the housing 124, or in embodiments utilizing the second light source 92, the second light source 92 may be positioned in the housing 124.

Figure 4C:
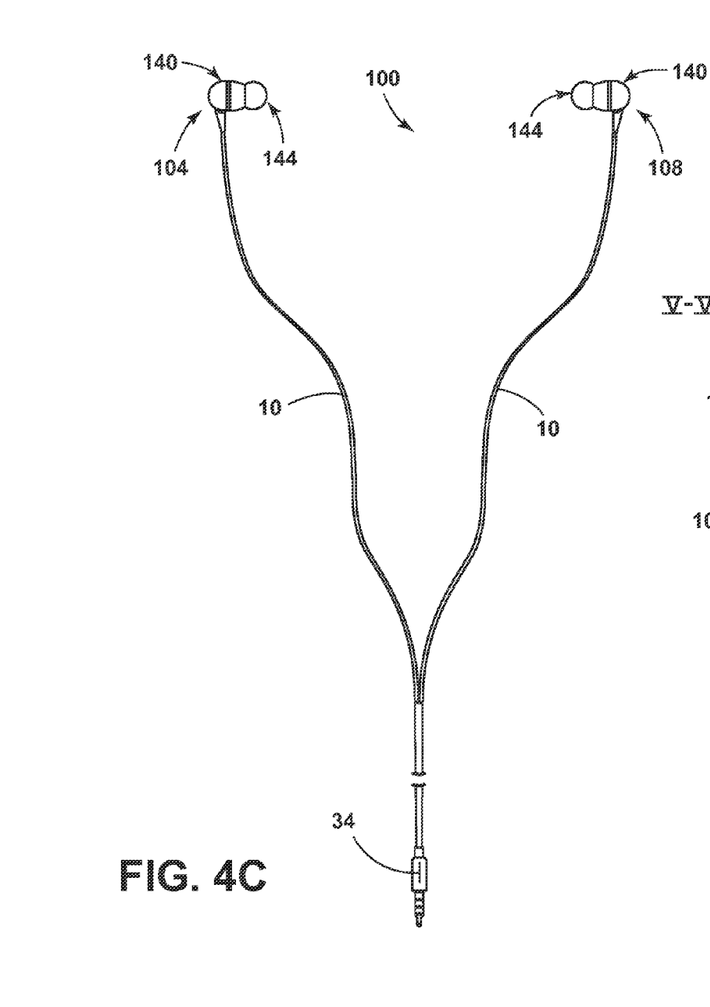
FIG. 4C is a front view of an earbud headset according to another embodiment.

Referring now to FIG. 4C, the audio speaker assemblies 104, 108 of the headset 100 may be in the form factor of earbuds and/or in-ear headphones. In the depicted embodiment, the headset 100 may employ two illuminated transmission cables 10, each connected to one of the first and second audio speaker assemblies 104, 108. The first and second audio assemblies 104, 108 each include a casing 140 and an in-the-ear piece 144, either of which may be optically coupled with the light-diffusing fiber 22 and configured to glow. The transmission cables 10 may have separate light sources permitting independent dynamic control of illumination color and frequency.

Figure 4D:
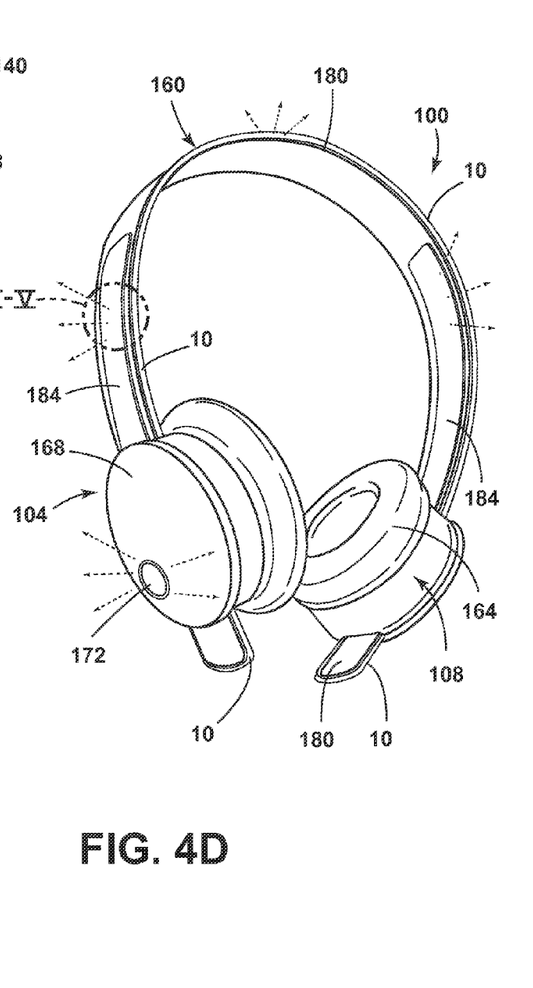
FIG. 4D is a perspective view of a headset according to another embodiment.

Referring now to the depicted embodiment of FIG. 4D, the headset 100 may be a wireless over-the-head headset. The headset 100 includes a headband 160 which functions as a connecting body between the first and second audio speaker assemblies 104, 108. The first and second audio speaker assemblies 104, 108 include on-the-ear/over-the-ear cups 164 coupled to an outer cover 168. The headband 160 is coupled to the first and second audio speaker assemblies 104, 108 and extends over the user's head while in use. The headset 100 may include a button 172 used for control of at least one feature of the electronic device 44 and/or headset 100 (e.g., volume, track selection, switching to an incoming telephone call, device mode, etc.).

The headband 160 is depicted as having the illuminated transmission cable 10 extending around an edge 180 of headband 160 and headset 100. The illuminated transmission cable 10 may provide an aesthetically pleasing illumination to the headset 100 with the scattered light 46, as well as function to transmit data and audio signals between the first and second audio speaker assemblies 104, 108 or controllers within the headset 100. The headset 100 may include one or more waveguides 184 positioned around the headset 100 and headband 160. In the depicted embodiment, waveguides 184 extend along a central region of both an inner surface and an exterior surface of the headband 160, but may also extend over the entirety of the headband 160. It should be understood that although depicted as a continuous structure, the waveguide 184 may incorporate a plurality of waveguides 184 forming a semi-continuous or discontinuous structure. The waveguide(s) 184 may be formed of a clear material capable of transmitting light such as acrylic, epoxy, urethane and fluorocarbon resins, silicone rubber, and combined resins of these materials. Additionally or alternatively, the headband 160 may include one or more logos or decals which may be in optical communication with the transmission cable 10 and configured to be illuminated. It should be understood that the outer covers 168 and the on-the-ear/over-the-ear cups 164 may be optically coupled to the transmission cable 10 such providing additional illumination to the headset 100.

Figure 5A:
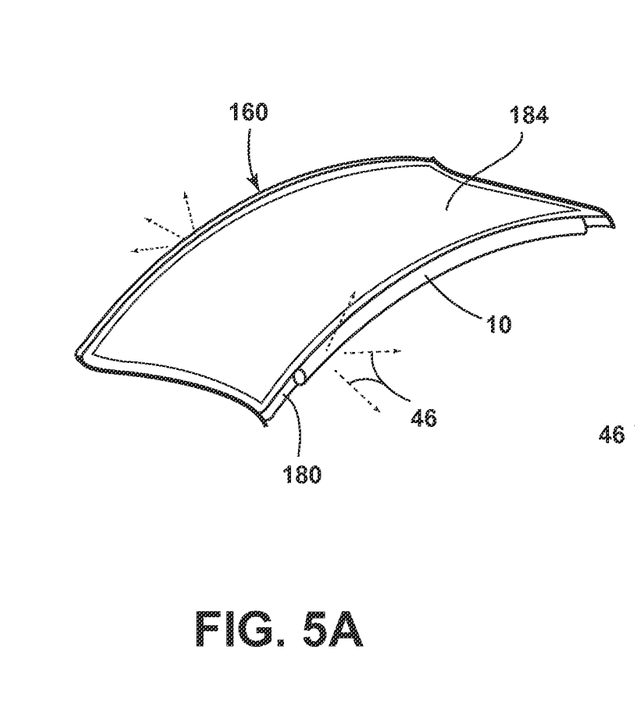
FIG. 5A is an enhanced view taken at V-V of FIG. 4D.

Referring now to FIG. 5A, the edge 180 of the headband 160 may have the transmission cable 10 coupled thereto. The transmission cable 10 may be coupled to the headband 160 in a variety of manners. For example, in mechanical fastening embodiments, the transmission cable 10 may be coupled into a groove defined on the edge 180 of the headband 160, threaded through a plurality of eyelets, or have at least one fastener attaching the transmission cable 10 to the headband 160. In adhesive coupling embodiments, the transmission cable 10 may be glued to the headband 160 using a clear adhesive. In some embodiments, the waveguide 184 may extend to and from the edge 180 of the headband 160. In such an embodiment, the scattered light 46 from the transmission cable 10 may enter the waveguide 184 and provide a side illumination of the waveguide 184.

Figure 5B:
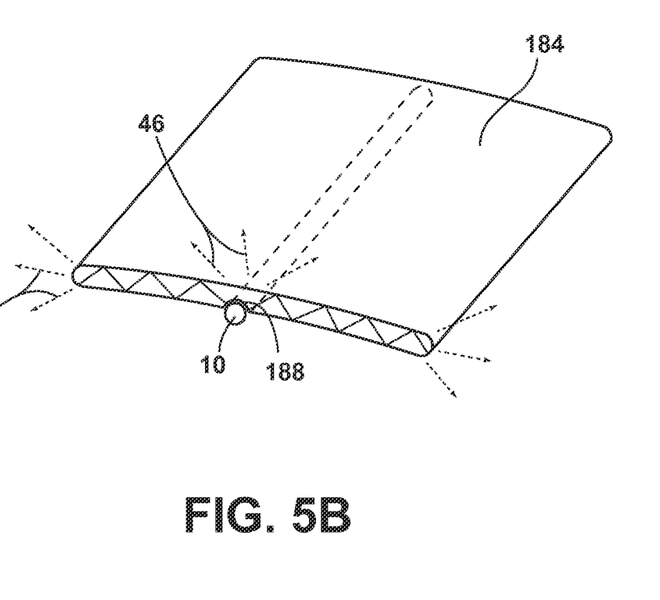
FIG. 5B is an enhanced view taken at V-V of FIG. 4D.

Referring now to FIG. 5B, the transmission cable 10 may extend through a groove 188 defined on an underside of the waveguide 184. In such a configuration, the scattered light 46 from the transmission cable 10 will enter the waveguide 184 and be dispersed throughout the waveguide 184, giving rise to a soft glow from the waveguide 184. The waveguide 184 may contain a plurality of scattering structures configured to diffuse the light 46. Additionally, the waveguide 184 may have a coating which aids in the diffusion of the light 46 to provide a soft glow illumination to the headset 100.

It will be apparent to those skilled in the art that various modifications and variations can be made without departing from the spirit or scope of the claims.

What is claimed is:

1. A headphone system, comprising:
   a first audio speaker assembly and a second audio speaker assembly;
   a connecting body extending between the first and second audio speaker assemblies;
   a light-diffusing fiber coupled with the connecting body, the light-diffusing fiber having a glass core and a cladding, wherein at least one of the glass core and a core-cladding interface includes a plurality of light scattering structures; and
   a light source optically coupled to the light-diffusing fiber and configured to emit light into the light-diffusing fiber, wherein the light scattering structures are configured to scatter the emitted light and output the emitted light at least partially along a sidewall of the light-diffusing fiber further comprising:
      a first conductive strip positioned on the light-diffusing fiber; and
      a second conductive strip positioned on the light-diffusing fiber, wherein the first and second conductive strips are printed on the light-diffusing fiber.

2. The headphone system of claim 1,
   wherein the light-diffusing fiber is positioned with a groove disposed along the edge of the connecting body.

3. The headphone system of claim 2, wherein a jacket is positioned around the electrical conductor and the light-diffusing fiber.

4. The headphone system of claim 1, wherein the connecting body comprises a translucent material, the connecting body optically coupled to the fiber and configured to guide light emitted from the fiber through the body.

5. The headphone system of claim 1, wherein the first and second audio speaker assemblies comprise respective first and second end caps in optical communication with the light-diffusing fiber.

6. The headphone system of claim 1, wherein the light-diffusing fiber has a scattering-induced attenuation of the emitted light greater than about 50 dB/km.

7. A headphone system, comprising:
   a first audio speaker assembly and a second audio speaker assembly;
   a light-diffusing fiber having a glass core and a cladding, at least one of the glass core and a core-cladding interface having a plurality of scattering structures, wherein the light-diffusing fiber is configured to optically couple with a light source which emits light into the light-diffusing fiber, wherein the scattering structures are configured to scatter the emitted light and output the emitted light along at least a portion of a sidewall of the light-diffusing fiber;
   an electrical conductor extending co-linearly with the light-diffusing fiber electrically coupled to said speakers; and
   a plug optically coupled to the light-diffusing fiber and configured to be illuminated by the light-diffusing fiber wherein a jacket is positioned around the electrical conductor and the light-diffusing fiber and, wherein the jacket comprises a photoluminescent material.

8. The headphone system of claim 7, wherein at least one of the first and second audio speaker assemblies includes a casing optically coupled to the light-diffusing fiber and configured to be illuminated by the light-diffusing fiber.

9. A headset, comprising:
   a light-diffusing fiber having a plurality of internal scattering structures, the fiber defining a first end and a second end and a sidewall extending between the first and second ends;
   a light source optically coupled to the first end of the light-diffusing fiber and configured to emit light into the first end, wherein at least some of the light is output from at least a portion of the sidewall of the light-diffusing fiber;
   an electrical conductor extending collinearly with the light-diffusing fiber;
   a cable jacket surrounding the light-diffusing fiber and the electrical conductor;
   a first audio speaker assembly and a second audio speaker assembly electrically coupled to the electrical conductor;
   a support member coupled to and extending between the first and second audio speaker assemblies; and
   a housing optically coupled with the second end of the light-diffusing fiber and including a control, wherein the second end of the light-diffusing fiber is configured to illuminate the housing, wherein the cable jacket comprises a photoluminescent material.

10. The headset of claim 9, further comprising:
    an electrical jacket positioned around the electrical conductor; and
    a reflective material positioned around the electrical jacket, the reflective material configured to reflect emitted light from the light-diffusing fiber.

11. The headset of claim 9, wherein the scattering structures have a diameter between about 10 nanometers and about 1 micron and the scattering structures comprise gas filled voids.

12. A headset, comprising:
    a light-diffusing fiber having a plurality of internal scattering structures, the fiber defining a first end and a second end and a sidewall extending between the first and second ends;
    a light source optically coupled to the first end of the light-diffusing fiber and configured to emit light into the first end, wherein at least some of the light is output from at least a portion of the sidewall of the light-diffusing fiber;
    an electrical conductor extending collinearly with the light-diffusing fiber;
    a cable jacket surrounding the light-diffusing fiber and the electrical conductor;

a first audio speaker assembly and a second audio speaker assembly electrically coupled to the electrical conductor;

a support member coupled to and extending between the first and second audio speaker assemblies; and a housing optically coupled with the second end of the light-diffusing fiber and including a control, wherein the second end of the light-diffusing fiber is configured to illuminate the housing, wherein an electrical jacket surrounds the electrical conductor, the electrical jacket comprises a photoluminescent material, and wherein the cable jacket is translucent.

13. A headset, comprising:

a first audio speaker assembly and a second audio speaker assembly;

a single light-diffusing fiber having a plurality of internal scattering structures and a sidewall;

a first conductive strip positioned on the light-diffusing fiber;

a second conductive strip positioned on the light-diffusing fiber, wherein the first and second conductive strips are printed on the light-diffusing fiber;

a single light source optically coupled with the light-diffusing fiber and configured to emit light into the light-diffusing fiber, wherein at least some of the emitted light is output along at least a portion of the sidewall of the light-diffusing fiber; and a transmission medium extending co-linearly with the light-diffusing fiber, the transmission medium in communication with the first and second audio speaker assemblies.

14. The headset of claim 13, wherein a cable jacket surrounds both the light-diffusing fiber and the transmission medium and comprises a photoluminescent material, and further wherein the transmission medium is surrounded by a transmission jacket comprising a photoluminescent material.

15. The headset of claim 14, wherein the scattering structures have a diameter between about 10 nanometers and about 1 micron and the scattering structures comprise gas filled voids.

16. The headset of claim 13, further comprising:

a connection point in electrical communication with the first and second conductive strips, wherein the connection point is movable along a length of the light-diffusing fiber.

17. The headset of claim 16, wherein at least one of the first and second conductive strips comprises a clear conductive material.

18. The headset of claim 13, wherein a housing is positioned on an end of the light-diffusing fiber, the housing being illuminated by emitted light exiting the light-diffusing fiber.

19. The headset of claim 13, wherein a support member extends between the first and second audio speaker assemblies, the light-diffusing fiber coupled to the support member.

20. The headset of claim 13, wherein the transmission medium is configured to transmit audio signals to the first and second audio speaker assemblies.

* * * * *